(12) United States Patent
Kastrup

(10) Patent No.: US 11,905,143 B2
(45) Date of Patent: Feb. 20, 2024

(54) METHOD FOR HANDLING A WIND TURBINE COMPONENT WITH A CONTROL ARRANGEMENT

(71) Applicant: Vestas Wind Systems A/S, Aarhus N. (DK)

(72) Inventor: Michael Kastrup, Ebeltoft (DK)

(73) Assignee: Vestas Wind Systems A/S, Aarhus N. (DK)

( * ) Notice: Subject to any disclaimer, the term of this patent is extended or adjusted under 35 U.S.C. 154(b) by 267 days.

(21) Appl. No.: 17/417,516

(22) PCT Filed: Dec. 17, 2019

(86) PCT No.: PCT/DK2019/050404
§ 371 (c)(1),
(2) Date: Jun. 23, 2021

(87) PCT Pub. No.: WO2020/135907
PCT Pub. Date: Jul. 2, 2020

(65) Prior Publication Data
US 2022/0055869 A1     Feb. 24, 2022

(30) Foreign Application Priority Data

Dec. 28, 2018   (DK) .......................... PA 2018 70878

(51) Int. Cl.
*B66C 13/08*     (2006.01)
*F03D 13/10*     (2016.01)
(Continued)

(52) U.S. Cl.
CPC ............ *B66C 13/08* (2013.01); *B66C 23/185* (2013.01); *B66D 1/7431* (2013.01); *F03D 13/10* (2016.05); *F05B 2230/61* (2013.01)

(58) Field of Classification Search
CPC ......... B66C 1/108; B66C 13/04; B66C 13/06; B66C 13/08; B66C 23/185; B66D 1/7431;
(Continued)

(56) References Cited

U.S. PATENT DOCUMENTS 481,888 A  *  8/1892  Bergeron et al. .. A62B 35/0087
                                                       182/47
2,709,526 A  *  5/1955  Hansen .................... B66C 3/00
                                                       414/625
(Continued)

FOREIGN PATENT DOCUMENTS

CA     2611343 A1    5/2008
CN   101220798 A     7/2008
(Continued)

OTHER PUBLICATIONS

Danish Patent and Trademark Office, Search and Examination Report in PA 2018 70878, dated May 23, 2019.
(Continued)

*Primary Examiner* — Michael R Mansen
*Assistant Examiner* — Henrix Soto
(74) *Attorney, Agent, or Firm* — Wood Herron & Evans LLP

(57) ABSTRACT

A method for handling a load (2) including a wind turbine component (202). The method includes, while a crane (1) is supported by a supporting element (G), arranging a control arrangement (501, 502), which is at least partly elongated and flexible, so as to extend, while the load (2) is lifted in a suspended manner with the crane (1), from the load (2) to an actuator (511, 512), located on the supporting element (G), at a distance from the crane (1). The actuator (511, 512) controls the orientation of the load (2) by the control arrangement (501, 502), and the control arrangement (501,
(Continued)

502) is extended, during the load orientation control, via a redirection device (531, 532) which is connected to the supporting element (G).

6 Claims, 7 Drawing Sheets

(51) Int. Cl.
  *B66C 23/18* (2006.01)
  *B66D 1/74* (2006.01)
(58) Field of Classification Search
  CPC ....... B66D 1/7452; F03D 13/10; F03D 13/20; F03D 13/40; F05B 2230/60; F05B 2230/604; F05B 2230/61; Y02E 10/72
  USPC .......................................................... 212/77
  See application file for complete search history.

(56) References Cited

U.S. PATENT DOCUMENTS

| | | | | |
|---|---|---|---|---|
| 3,912,088 | A | * | 10/1975 | Bronfman ............... B66C 13/06 212/274 |
| 4,111,281 | A | * | 9/1978 | Jacobs ..................... A62B 1/02 182/142 |
| 4,399,979 | A | | 8/1983 | Adelman |
| 9,840,401 | B2 | * | 12/2017 | Hansen ................. B66C 23/185 |
| 2004/0118635 | A1 | * | 6/2004 | Sun ........................... A62B 1/06 182/142 |
| 2014/0263141 | A1 | * | 9/2014 | May ........................ B66C 21/04 212/242 |
| 2014/0360015 | A1 | * | 12/2014 | Lohan ................... F03D 1/0658 29/889.1 |
| 2015/0232307 | A1 | | 8/2015 | Holloway et al. |
| 2016/0002010 | A1 | * | 1/2016 | May ....................... E04G 23/084 212/273 |
| 2016/0138561 | A1 | | 5/2016 | Hoffmann et al. |
| 2016/0200553 | A1 | | 7/2016 | Sorensen et al. |
| 2017/0233228 | A1 | | 8/2017 | Coners et al. |

FOREIGN PATENT DOCUMENTS

| | | | | | |
|---|---|---|---|---|---|
| CN | 101230835 | A | | 7/2008 | |
| CN | 102791608 | A | | 11/2012 | |
| DE | 102009058268 | A1 | * | 6/2011 | ............ B66C 23/18 |
| EP | 0079593 | A2 | | 5/1983 | |
| EP | 1925582 | A1 | | 5/2008 | |
| FR | 1171785 | A | | 1/1959 | |
| JP | 2008232071 | A | | 10/2008 | |
| WO | WO-2009092191 | A1 | * | 7/2009 | ............... F03D 1/04 |
| WO | 2011088832 | A1 | | 7/2011 | |
| WO | 2011137937 | A2 | | 11/2011 | |
| WO | WO-2014082641 | A1 | * | 6/2014 | ............ B66C 1/108 |
| WO | 2015165463 | A1 | | 11/2015 | |
| WO | 2018121822 | A1 | | 7/2018 | |
| WO | WO-2018192687 | A1 | * | 10/2018 | ............ B66C 13/08 |

OTHER PUBLICATIONS

European Patent Office, International Search Report and Written Opinion in PCT Application No. PCT/DK2019/050404, dated Mar. 20, 2020.
China National Intellectual Property Administration, office action issued in corresponding Chinese Application No. 201980092565.8, dated Apr. 17, 2023, with English translation.
European Patent Office, Office Action issued in corresponding EP Application No. 19828217.0, dated Mar. 29, 2023.

* cited by examiner

METHOD FOR HANDLING A WIND TURBINE COMPONENT WITH A CONTROL ARRANGEMENT

TECHNICAL FIELD

The present invention relates to a method for handling a load comprising a wind turbine component.

BACKGROUND INFORMATION

A horizontal axis wind turbine is known to have an electric generator in a nacelle on top of a tower, where a rotor with a substantially horizontal axis mounted to the nacelle and arranged to drive the generator. The nacelle is usually arranged to be rotated in relation to the tower, to point the rotor towards the wind.

With growing sizes of horizontal axis wind turbines, challenges in handling of components, such as blades, increase. For example, it is known, e.g. during wind turbine installation or service, to extend one or more control lines from a wind turbine component, suspended from a crane, to a respective person on the ground. An advantage with such manual handling is that no alteration need to be done to the crane, and therefore it is simple to implement. However, due to the size of the wind turbine, including a relatively large height, the person(s) may be required to move across a large area on the ground, to retain control. This might entail the need to take precautions to avoid safety hazards, e.g. where the ground is uneven, and/or covered with vegetation, or other obstacles.

WO2011137937A2 relates to controlling the lifting of a component of a wind turbine. It is suggested to provide a cantilever arm extending radially outwards from the component, or from a lifting system for lifting the component. However, this solution may not necessarily solve the problem described above.

SUMMARY OF THE INVENTION

It is an object of the present invention is to facilitate the handling of wind turbine components. It is a further object of the present invention to provide a method for handling wind turbine components, which is simple to implement, and provides a high degree of control and safety.

The objects are reached with a method according to claim 1. Thus, the invention provides a method for handling a load comprising a wind turbine component. The method comprises, while a crane is supported by a supporting element, arranging a control arrangement, which is at least partly elongated and flexible, so as to extend, while the load is lifted in a suspended manner with the crane, from the load to an actuator, located on the supporting element, at a distance from the crane. The actuator may control the orientation of the load by means of the control arrangement. The control arrangement may be extended, during the load orientation control, via a redirection device which is connected to the supporting element.

The control arrangement may be arranged so as to extend from the load to the actuator via the redirection device. A control line of the control arrangement may change direction at the redirection device. The redirection device allows easy handling of the control arrangement, avoiding a need for personnel to move across the ground while pulling control line ends. The reason is that a control line of the control arrangement could run at a non-changing angle from the redirection device to a person, or a winch, regardless how the component moves up above. Such a constant angle provides for an improved control. In addition, avoiding the need for persons to move around on the ground increases safety. In addition, the method may be simple to use, without the need for any modifications to the crane.

It is understood that arranging the control arrangement, so as to extend from the load to the actuator, may be done before the load is lifted with the crane. For example, the control arrangement may be connected to the load before the load is lifted. The actuator may engage with the control arrangement before the load is lifted, or while the load is lifted.

The load may include, in addition to the wind turbine component, a lifting device such as a lifting yoke. The lifting device may be arranged to carry the component. The lifting device may be arranged to be suspended from a lifting line of the crane. The crane may comprise a load support structure arranged to lift the load in a suspended manner. The crane may comprise a ballast arranged to counteract the weight of the lifted load.

The actuator may control the orientation of the load by means of the control arrangement, e.g. pulling or releasing a control line of the control arrangement. The actuator may control the orientation of the load from a control position on the supporting element. The actuator may be a person, who may move on the supporting element. Thus, the control position may move on the supporting element. The redirection device may be a pulley. The redirection device may be connected to the supporting element via at least a flexible connection device.

The control arrangement may comprise one or more control lines. The control arrangement may comprise a control line connected to the load, e.g. to the wind turbine component or to the lifting yoke. The control line may be connected to the load directly, or via at least one intermediate further control line. The redirection device may be provided between the actuator and the load. The redirection device may be located at a distance from the actuator.

As suggested, the redirection device may be connected to the supporting element. The supporting element may be the ground. In some embodiments, the supporting element may be a marine vessel, e.g. in offshore applications.

Preferably, the redirection device is, during the load orientation control, located at a distance from the crane. Thus, the redirection device may be connected to the supporting element, separately from the crane. The redirection device may be located in the vicinity of the actuator.

Preferably, the redirection device is connected to the supporting element via a ballast. Thereby, the redirection device may be firmly secured. Thereby, it may be secured that the redirection device provides easy handling of the control arrangement, avoiding need for personnel to move across the ground pulling control line ends.

In some embodiments, the ballast is, during the load orientation control, located at a distance from the crane. Thereby, the redirection device may be located such as to provide an angle to the load which is beneficial to the load control, without consideration for the location of the crane.

In some embodiments, the redirection device may be, during the load orientation control, located on the crane. Thus, the redirection device may be connected to the supporting element via the crane. For example, the redirection device may be located on the crane ballast. Thereby, the need to provide a separate ballast for the redirection device is eliminated. In such embodiments, the actuator, may be located on the supporting element, at a distance from the crane. Thereby, where the actuator is a person, that person may be located at a safe distance from the crane. The redirection device may be located on an outer, vertical side of the crane ballast. Thereby, the risk if interference of the control arrangement with crane parts may be reduced.

As suggested, the actuator may be a person. Thus, a person may provide power for the control of the orientation of the load. Thereby, a manual actuation may be provided. Thereby, any suitable crane may be used for the wind turbine components handling, without any need for alterations or adaptions of the crane for the handling. Thereby costly procedures for crane alterations, including certification, may be avoided.

In some embodiments, the actuator may be a motor, e.g. electric or hydraulic. Such a motor may be controlled by a person.

Preferably, the control arrangement comprises a gear arrangement. The gear arrangement may be provided between the actuator and the load. Thereby, forces needed for the load control, e.g. from a person as an actuator, may be reduced.

The gear arrangement may comprise a rope and pulley system. Thereby a gear arrangement which is simple to implement is provided. A rope and pulley system may allow for an improved control of the control arrangement, especially under manual operation. The rope and pulley system may be provided between the actuator and the load. The control arrangement may comprise a control line, which is a rope in the rope and pulley system. A rope and pulley system may be provided as a block and tackle. The rope and pulley system may use a single continuous rope to transmit a tension force around one or more pulleys to move the load. The rope of the rope and pulley system may be of any suitable type, e.g. a light line or a strong cable. The rope and pulley system may be assembled so that a block is attached to a fixed mounting point and another block is attached to the load. The fixed block, or a pulley therein, may form the redirection device. Depending of the gear ratio desired, the rope and pulley system may be of a suitable type, for example one of a gun tackle, a luff tackle, a double tackle, a gyn tackle, or a threefold purchase.

Preferably, the rope and pulley system comprises a locking device. Thereby, an actuator in the form of a person, can lock the control arrangement, e.g. temporarily, to obtain relief from forces in the control arrangement. The locking device may be in the form of a cam cleat.

As suggested, the redirection device may form a pulley in the rope and pulley system. The rope and pulley system may be provided between the load and the supporting element, such as the ground, or between the load and a ballast, supported, e.g. directly or indirectly, on the supporting element.

In some embodiments, the gear arrangement comprises a first rope and pulley system, and a second rope and pulley system, arranged in series along the control arrangement. Thereby, the method may comprise arranging, for the orientation control, a second rope and pulley system between a first rope and pulley system and the load. The second rope and pulley system may comprise a second control line. The first and second rope and pulley systems may have different gear ratios. For example, one of the rope and pulley systems may provide a relatively low gear ratio, e.g. 2:1, while the other of the rope and pulley systems may provide a relatively high gear ratio, e.g. 6:1. Thereby, a relatively high speed manipulation may be allowed by the low ratio rope and pulley system, while a more accurate load control may be allowed by the relatively low speed manipulation provided by the high ratio rope and pulley system.

In some embodiments, the gear arrangement comprises a winch, the redirection device being located, along the control arrangement, between the winch and the load. Thus, the winch may be located on a side of the redirection device which is opposite to the load. Thus, the redirection device may be located between the winch and the load. The winch may be functionally located between the actuator and the redirection device. The winch may be powered manually or by a motor, such as an electric motor or a hydraulic motor.

The winch may be combined with a rope and pulley system. Thereby a particularly improved effectiveness of a manual wind turbine component control process may be provided.

The objects are also reached with a further method for handling a load comprising a wind turbine component. The method comprises, while a crane is supported by a supporting element, arranging a control arrangement, which is at least partly elongated and flexible, so as to extend, while the load is lifted in a suspended manner with the crane, from the load to an actuator. The actuator may control the orientation of the load by means of the control arrangement. The control arrangement may be extended, during the load orientation control, via a redirection device which is located on the crane. The control arrangement may comprise a rope and pulley system, wherein the redirection device forms a pulley in the rope and pulley system. The gear arrangement may comprise a winch, the winch being located on the crane The redirection device may be located, along the control arrangement, between the winch and the load.

The winch may be located on a side of the redirection device which is opposite to the load. The redirection device may be located between the actuator and the load. The winch may be located between the actuator and the redirection device. The redirection device may be connected to the supporting element via a ballast of the crane.

Thereby, a rope and pulley system is combined with a winch, in an interface to the crane. The rope and pulley system provides for a relatively small winch to be used. Thereby, the winch may be manually handled, i.e. the actuator may be a person. The person may be placed on the crane. Thereby, the simplicity of manual handling, avoiding the need for crane alterations, may be retained.

BRIEF DESCRIPTION OF THE DRAWINGS

Below, embodiments of the invention will be described with reference to the drawings, in which.

DETAILED DESCRIPTION OF EMBODIMENTS

Figure 1:
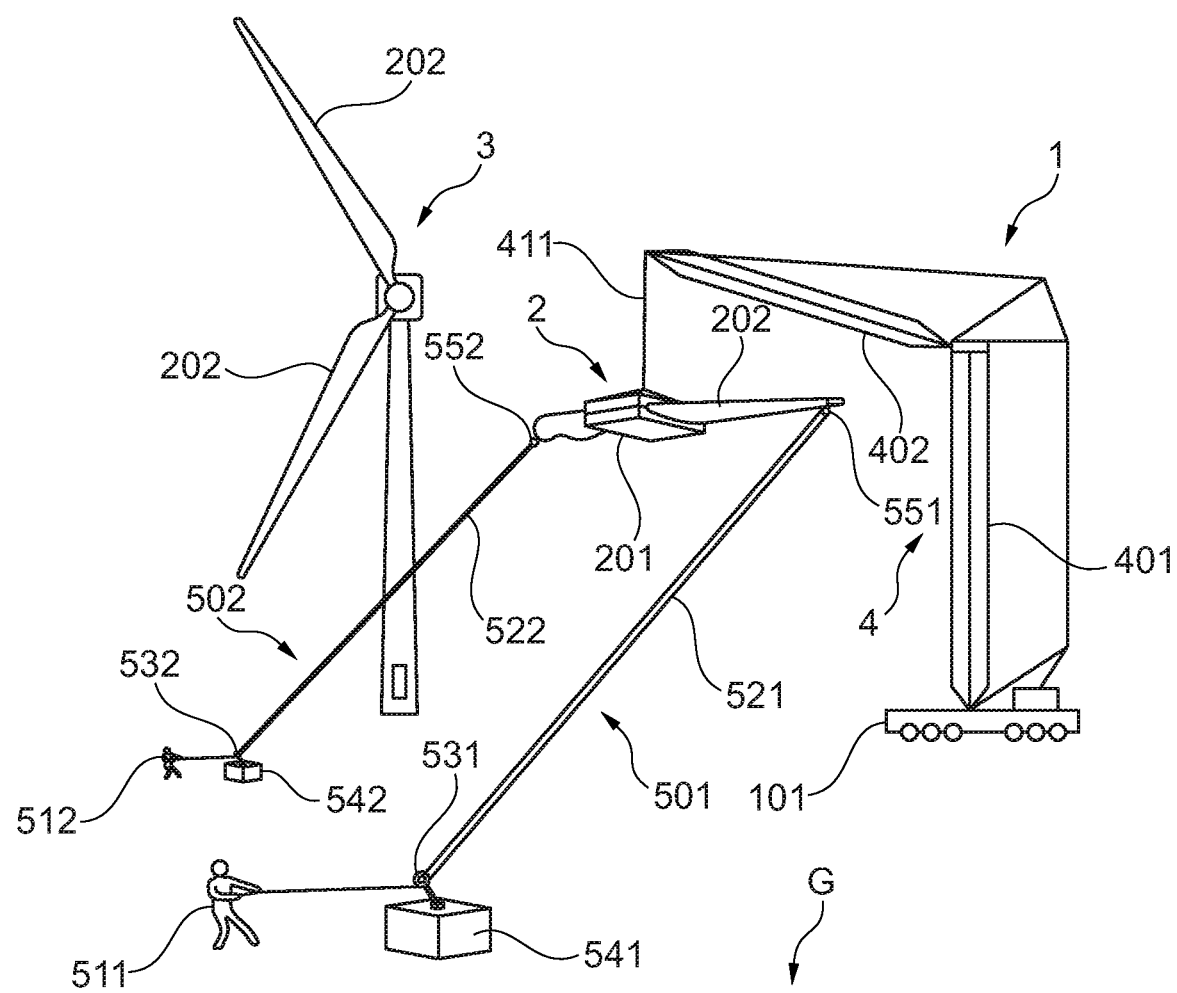
FIG. 1 shows a perspective view of a wind turbine, and a crane, from which a component of the wind turbine is suspended, which component is handled with a method according to an embodiment of the invention.

FIG. 1 shows a crane 1. The crane may be adapted to lift a load 2. The load may comprise a yoke 201. The yoke may be adapted to hold a wind turbine component 202. The wind turbine component may be a wind turbine blade 202, as illustrated in FIG. 1. The lifting assembly might be used for installing a wind turbine 3, as illustrated in FIG. 1. For example, the lifting assembly might be used to install one or more blades 202 of the wind turbine, as exemplified in FIG. 1.

The crane 1 may comprise base with an undercarriage and an over carriage. The over carriage may be connected to the undercarriage via a slewing bearing. The over carriage may be arranged to rotate, around a substantially vertical axis, in relation to the undercarriage, by means of the slewing bearing. The over carriage may comprise a ballast.

The crane may be a mobile crane. The crane may be supported by a supporting element in the form of the ground G. Embodiments of the invention may be performed for an onshore wind turbine installation. In some embodiments, the crane may be supported by a supporting element in the form of a marine vessel. Embodiments of the invention may be performed for an offshore wind turbine installation.

The crane 1 may comprise an elongated boom assembly 4, as exemplified in FIG. 1. The boom assembly may be mounted on the over carriage. The boom assembly 4 may comprise a first boom segment 401, and a second boom segment 402. The first boom segment may form a main boom 401. The second boom segment may form a jib 402. The crane may be arranged to allow luffing of the second boom segment in relation to the first boom segment. A lower end of the first boom segment 401 may be connected to the base 101, so as to allow luffing of the first boom segment 401 in relation to the base 101.

The crane 1 may be adapted to keep the load 2 suspended from the boom assembly 4. The lifting assembly may be adapted to keep the load 2 suspended from the second boom segment 402. The crane may be adapted to keep the load 2 suspended by means of a lifting wire 411. The height of the load 2 may be controlled by the crane 1.

Figure 2:
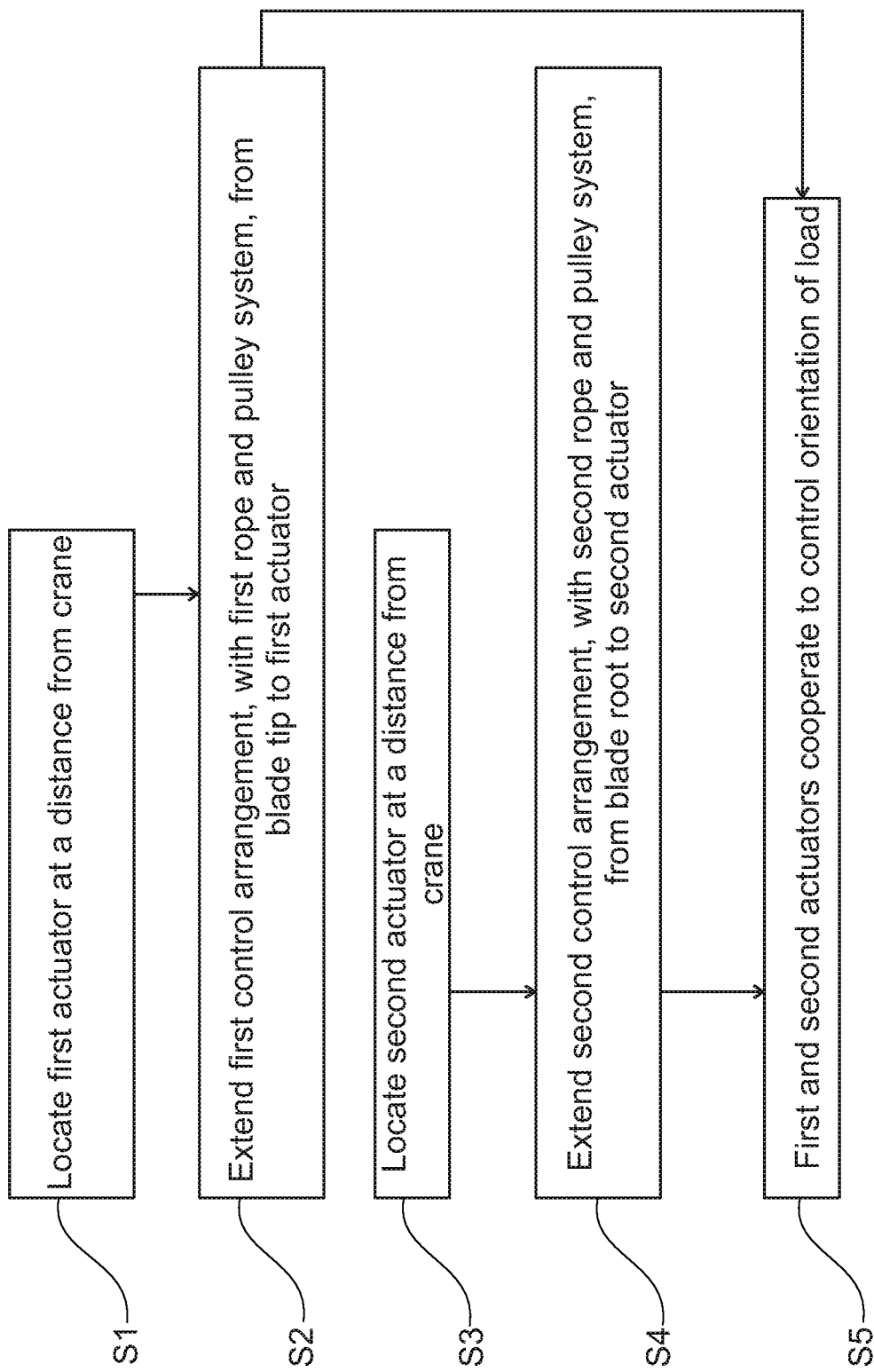
FIG. 2 is a block diagram depicting steps of said method.

Reference is made also to FIG. 2. Embodiments of the invention provides a method for handling a load comprising a wind turbine component, e.g. in the form of a blade, as exemplified in FIG. 1. The blade 202 of the load may be oriented substantially horizontally, when lifted.

The method may comprise arranging a first control arrangement 501 so as to extend, while the load 2 is suspended from the crane 1, from the tip of the blade 202, to a first actuator 511. The first actuator may be a person 511. The first actuator 511 may be located on the supporting element G. The first actuator 511 may be located S1 at a distance from the crane 1. The first control arrangement 501 may be partly elongated and flexible. More specifically, the first control arrangement may comprise a first control line 521, e.g. in the form of a rope. The first actuator 511 may control the orientation of the load 2 by means of the first control arrangement 501.

The first control arrangement 501 may be extended, during the load orientation control, via a first redirection device 531 which is connected to the supporting element G. The first redirection device 531 may be, during the load orientation control, located at a distance from the crane 1. The first redirection device 531 may be connected to the supporting element G via a first ballast 541. The first ballast 541 may be, during the load orientation control, located at a distance from the crane 1. The first ballast 541 may serve to anchor the first redirection device 531.

The first control arrangement 501 may comprise a first gear arrangement. The first gear arrangement may be arranged S2 so as to comprise a first rope and pulley system 521, 531, 551. A pulley in the first rope and pulley system may form the first redirection device 531. The first rope and pulley system may form what is known as a gun tackle. Thereby, the first control line 521 may extend from the pulley forming the redirection device 531, to a further pulley 551 at the load, in this example at the blade tip, back to the pulley forming the redirection device 531, and further to the first actuator 511.

The method may also comprise arranging a second control arrangement 502 so as to extend, while the load 2 is suspended from the crane 1, from the root of the blade 202, to a second actuator 512. The second actuator may be a person 512. The second actuator 512 may be located on the supporting element G. The second actuator 512 may be located S3 at a distance from the crane 1. The second control arrangement may comprise a second control line 522, e.g. in the form of a rope. The second actuator 512 may control the orientation of the load 2 by means of the second control arrangement 502.

The second control arrangement 502 may be extended, during the load orientation control, via a second redirection device 532 which is connected to the supporting element G. The second redirection device 532 may be, during the load orientation control, located at a distance from the crane 1. The second redirection device 532 may be connected to the supporting element G via a second ballast 542.

The second control arrangement 502 may comprise a second gear arrangement. The second gear arrangement may be arranged S4 so as to comprise a second rope and pulley system 522, 532, 552. A pulley in the second rope and pulley system may form the second redirection device 532. The second rope and pulley system may form a gun tackle.

The first actuator 511 and the second actuator 512 may cooperate S5 to control the orientation of the load 2 by means of the first and second control arrangements 501, 502.

Figure 3:
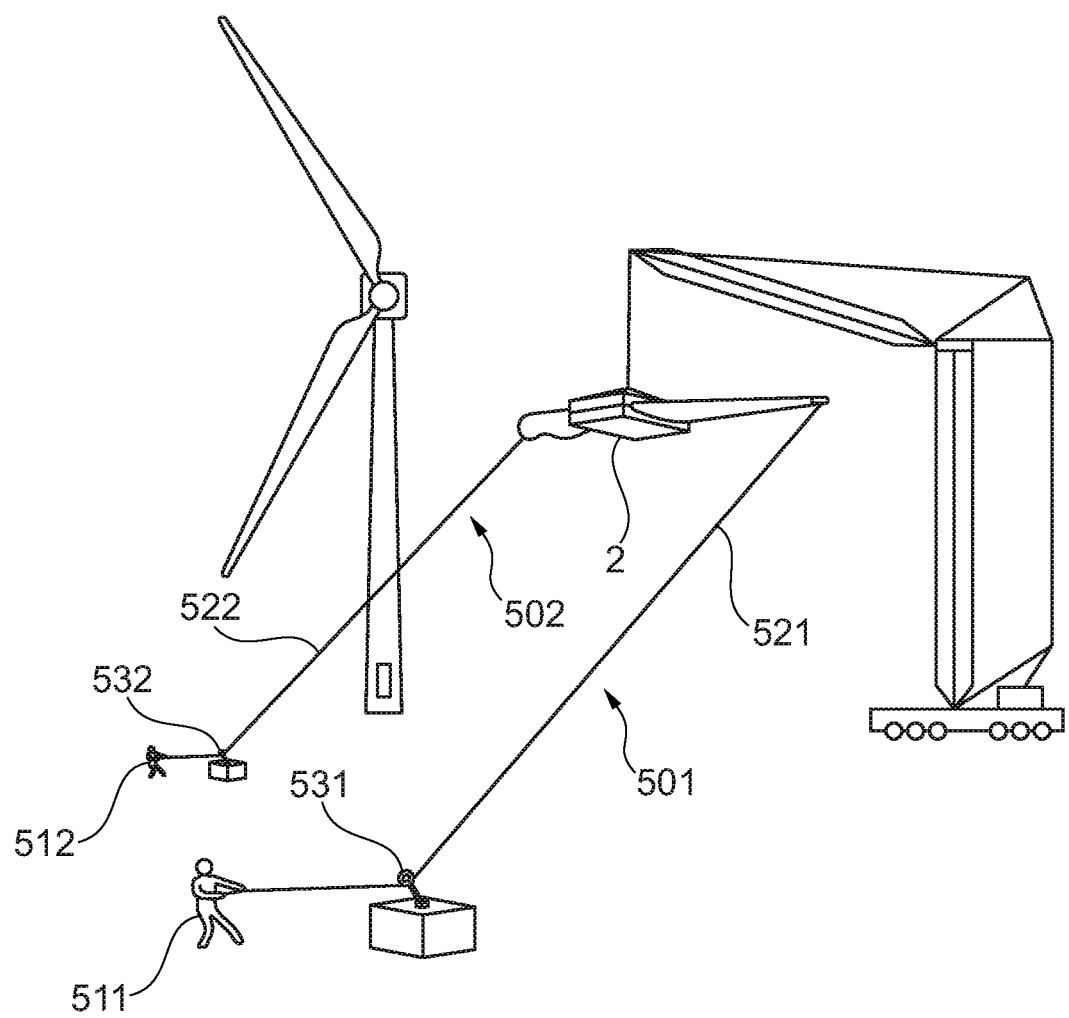
FIG. 3 shows a perspective view of a wind turbine, and a crane, from which a component of the wind turbine is suspended, which component is handled with a method according to an alternative embodiment of the invention.

It should be noted that in some embodiments, the control arrangement(s) 501, 502 may be provided without any gear arrangement, as exemplified in FIG. 3. In such embodiments, each control arrangement 501, 502 may comprise a control line 521, 522 extending from the load 2 to the respective actuator 511, 512 via the respective redirection device 531, 532. The redirection device 531, 532 may be provided in the form of a pulley.

Figure 4:
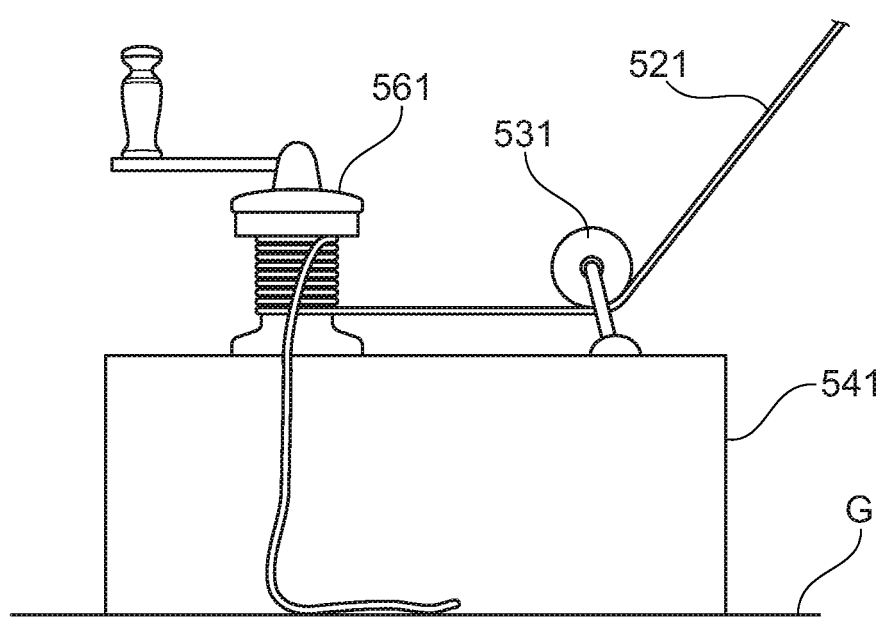
FIG. 4 shows parts of a control arrangement to be used in a method according to another embodiment of the invention.

In some embodiments, the control arrangement may comprise a gear arrangement comprising a winch 561, as exemplified in FIG. 4. Thereby, the redirection device 531 may be located, along the control arrangement, between the winch 561 and the load. In some embodiments, control arrangement 501 may comprise a control line 521 extending from the load to the winch 561 via the redirection device 531. The redirection device 531 may be provided in the form of a pulley. The actuator may be a person driving the winch by hand. Alternatively, the actuator may be a motor, e.g. an electric or hydraulic motor, driving the winch 561. The winch and the redirection device may be fastened to a ballast 541. The ballast 541 may be supported directly by the supporting element G, at a distance from the crane.

Figure 5:
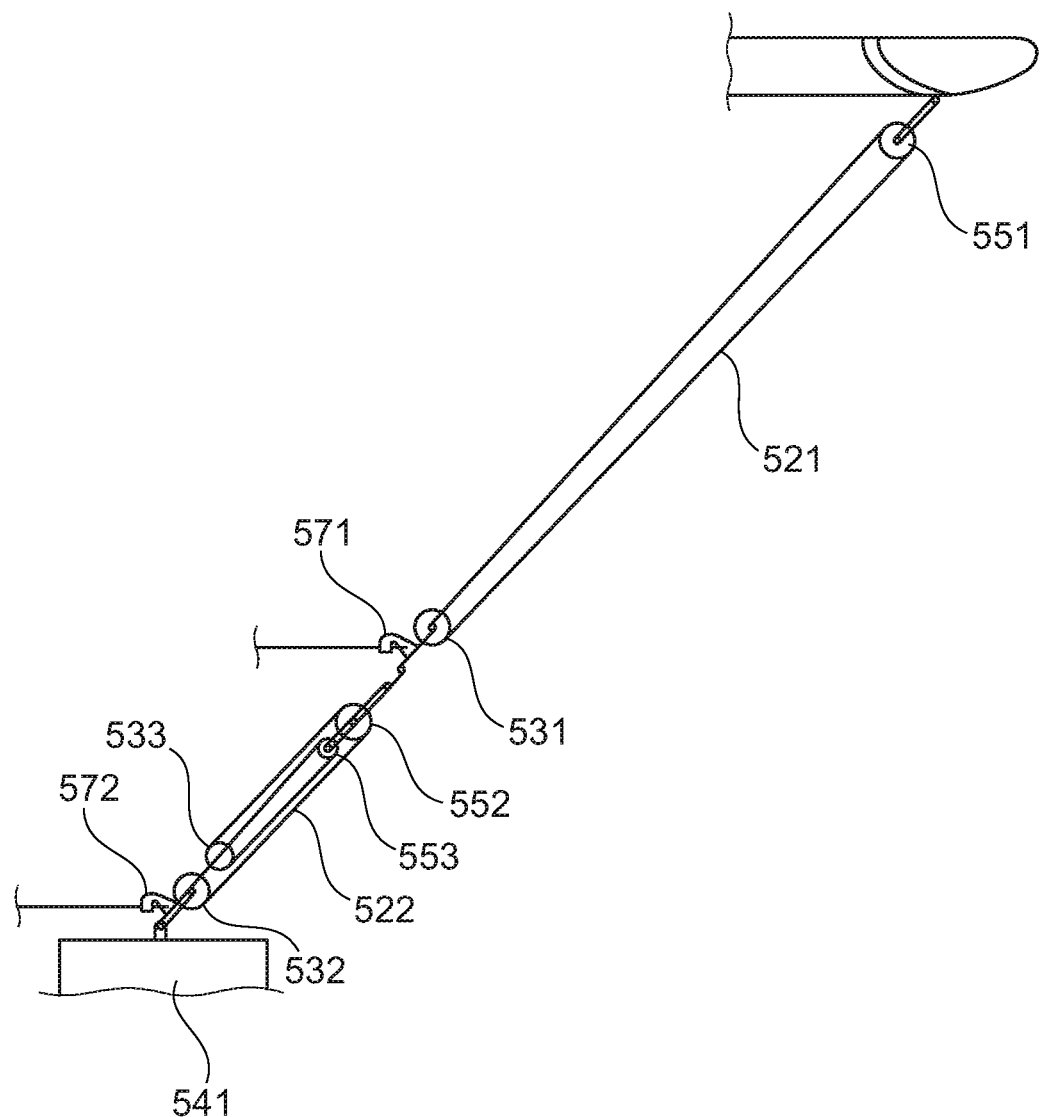
FIG. 5 shows parts of a control arrangement to be used in a method according to yet another embodiment of the invention.

In some embodiments, the control arrangement may comprise a gear arrangement comprising a first rope and pulley system, and a second rope and pulley system, arranged in series along the control arrangement, as exemplified in FIG. 5. A pulley in the first rope and pulley system may form a first redirection device 531. The first rope and pulley system may form a gun tackle. Thereby, the first rope and pulley system may comprise a first control line 521 which extends from the pulley forming the first redirection device 531, to a further pulley 551 at the load, back to the pulley forming the redirection device 531, and further to the actuator (not shown).

The second rope and pulley system may form what is known as a double tackle. Thereby, the second rope and pulley system may comprise a second control line 522 which extends four times between a first block with two pulleys 532, 533, and a second block with two further pulleys 552, 553. The first block may be fastened to a ballast 541. The second block may be connected to the first redirection device 531 of the first rope and pulley system. One of the pulleys in the first block may form a second redirection device 532. The second control line 522 may extend via the second redirection device 532 to the actuator (not shown).

Thereby, the first and second rope and pulley systems have different gear ratios. This provides the actuator with a possibility to shift the load control between a control with relatively large movements and relatively small forces, and another control with relatively small movements and relatively large forces.

A rope and pully system of the control arrangement may comprise a locking device 571, 572, for example as depicted in FIG. 5. The locking device 571, 572 may be provided as a cam cleat.

In some embodiments, the redirection device is, during the load orientation control, located on the crane. The redirection device may be, during the load orientation control, located on a ballast of the crane.

Figure 6:
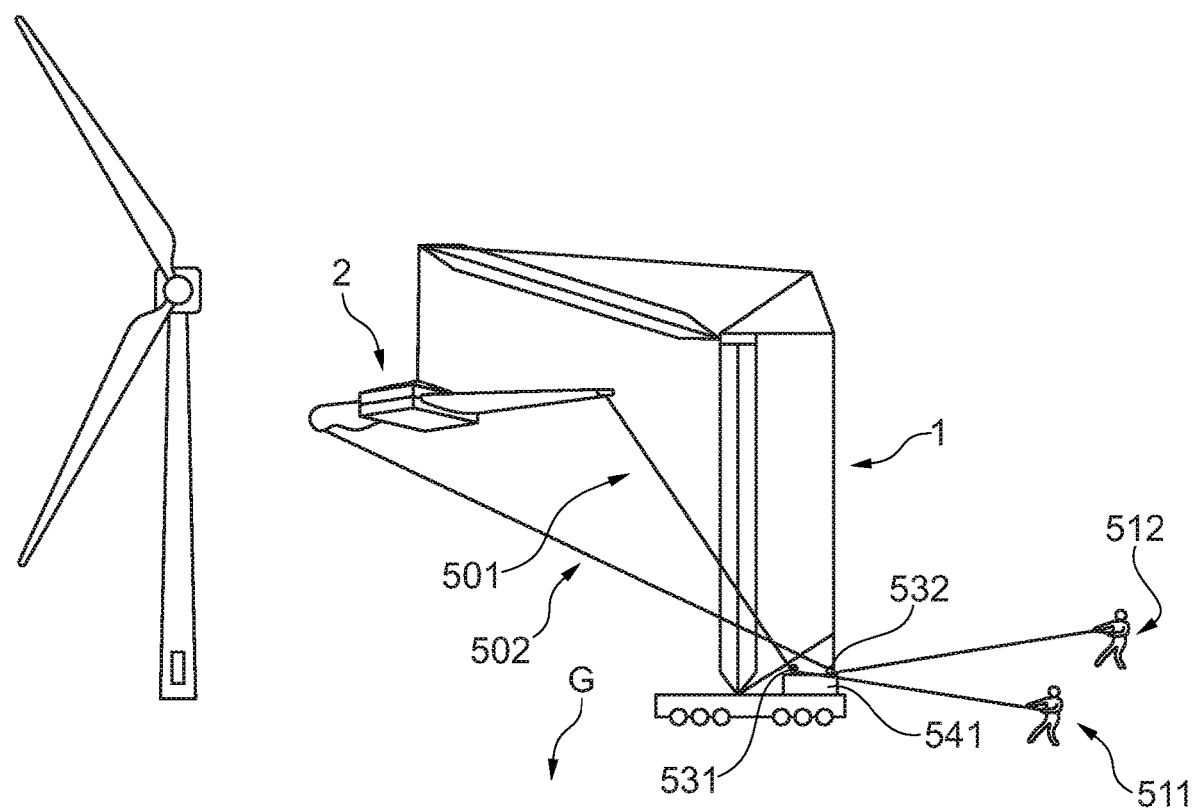
FIG. 6 shows a perspective view of a wind turbine, and a crane, from which a component of the wind turbine is suspended, which component is handled with a method according to a further embodiment of the invention.

Reference is made to FIG. 6. In embodiments of the invention, first and second control arrangements 501, 502 may be extended, during the load orientation control, via respective first and second redirection devices 531, 532, which are mounted on the crane 1. The redirection devices 531, 532 may be mounted on a ballast 541 of the crane 1. Two actuators 511, 512 may be located on the supporting element G, at respective distances from the crane 1. Thereby, the control arrangements 501, 502 may extend from the load 2 to a respective of the actuators 511, 512, via a respective of the redirection devices 531, 532.

Figure 7:
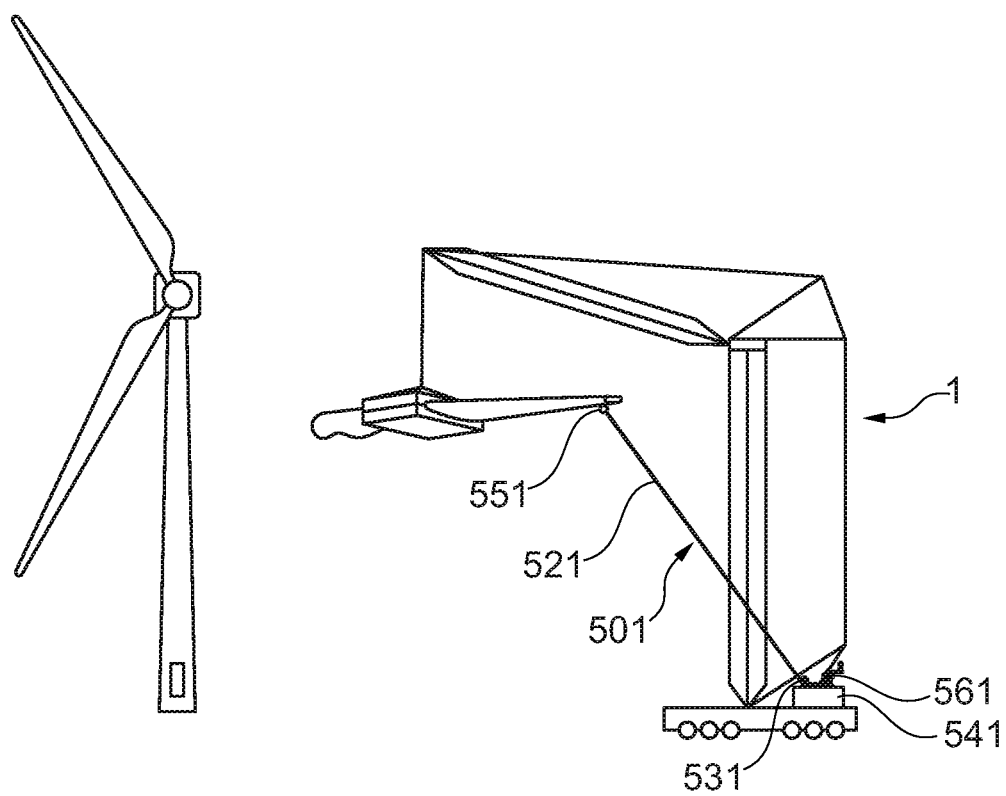
FIG. 7 shows a perspective view of a wind turbine, and a crane, from which a component of the wind turbine is suspended, which component is handled with a method according to an additional embodiment of the invention.

Reference is made to FIG. 7. In some embodiments, the control arrangement 501 is extended, during the load orientation control, via a redirection device 531 which is located on the crane 1. The redirection device 531 may be mounted on a ballast 541 of the crane 1. The control arrangement 501 may comprise a rope and pulley system. A pulley in the rope and pulley system may form the redirection device 531. The rope and pulley system may comprise a control line 521 running between the redirection device 531 and another pulley 551 at the load 2.

The control arrangement 501 may further comprise a winch 561. The winch 561 may be located on the crane. The redirection device 531 may be located, along the control arrangement 501, between the winch 561 and the load 2. The rope and pulley system provides for the winch to be small enough to be driven by an actuator in the form of a person. Alternatively, the actuator may be a motor, e.g. an electric or hydraulic motor, driving the winch 561.

As will be understood by those skilled in the present field of art, numerous changes and modifications may be made to the above described and other embodiments of the present invention, without departing from its scope as defined in the appending claims.

The invention claimed is:

1. A method for handling a load comprising a wind turbine component, comprising,
  while a crane is supported by a supporting element, arranging a control arrangement, which is at least partly elongated and flexible, so as to extend, while the load is lifted in a suspended manner with the crane, from the load to an actuator,
  the actuator controlling the orientation of the load by means of the control arrangement,
  characterised by
  the control arrangement being extended, during the load orientation control, via a redirection device which is connected to the supporting element,
  wherein the redirection device is located on the crane,
  wherein the actuator is located at a distance from the redirection device and at a distance from the crane,
  wherein the control arrangement comprises a gear arrangement, wherein the gear arrangement comprises a rope and pulley system, wherein the redirection device forms a pulley in the rope and pulley system,
  the gear arrangement comprising a winch, the winch being located on the crane, the redirection device being located, along the control arrangement, between the winch and the load.

2. The method according to claim 1, wherein the actuator is moveable relative to the supporting element.

3. The method according to claim 1, wherein the actuator is a person.

4. The method according to claim 1, wherein the rope and pulley system comprises a locking device.

5. The method according to claim 1, wherein the gear arrangement comprises a first rope and pulley system, and a second rope and pulley system, arranged in series along the control arrangement.

6. The method according to claim 5, wherein the first and second rope and pulley systems have different gear ratios.

* * * * *